Aug. 31, 1965     C. P. COLDREN     3,203,459
FASTENING DEVICE
Filed Dec. 29, 1961
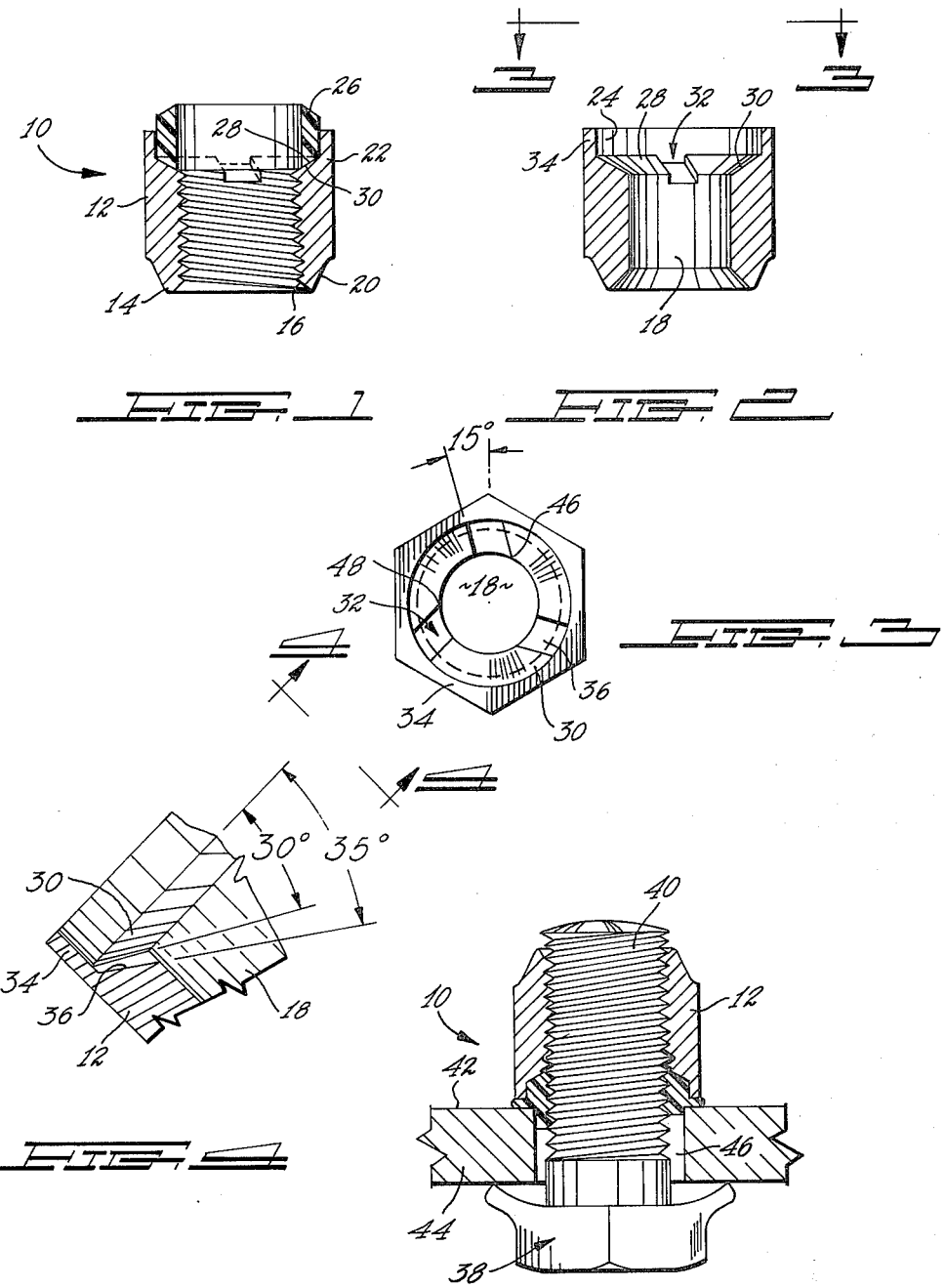
INVENTOR.
Chester P. Coldren
BY
Attorney

United States Patent Office 3,203,459
Patented Aug. 31, 1965

3,203,459
FASTENING DEVICE
Chester P. Coldren, Canton, Ohio, assignor to Eaton Manufacturing Company, Cleveland, Ohio, a corporation of Ohio
Filed Dec. 29, 1961, Ser. No. 163,267
4 Claims. (Cl. 151—7)

Broadly, this invention relates to a combination fastener device and more particularly, pertains to a self-locking and sealing washer and nut assembly.

Present day applications and needs for fastening devices have proved innumerable where heretofore welding, brazing, riveting and other forms of work piece securing means have been utilized. Many applications for fasteners include the securing of work surfaces where a positive seal therebetween is necessary and important to the proper functioning of the elements so assembled. However, many of the self-locking and sealing devices marketed have proved inadequate and ineptly designed for the particular requirement of locking.

The novel concept presented herein embodies as a primary objective the provision of a combination nut and washer assembly which insures the performance of the function of locking as well as sealing. The assembly has been formed whereby the nut has a recessed annular portion radially disposed from an internal threaded portion and axially spaced therefrom in relationship to the remainder of the nut body. This recessed portion has a conical surface which acts as a working surface engageable with a resilient pliable washer material such as nylon inserted in the recessed portion. Formed in the working surface is a single or a series of angularly disposed grooves, depending upon the desired results and application, which have a bottom portion tapered inwardly toward the threaded portion of the nut to act as a channel directing the flow of washer material to the threaded portion and accordingly, into the threads of a correspondingly threaded member to which the nut is secured. Where locking is required yet the application does not warrant a high degree of retention, one groove in the recess may suffice. Where additional locking force is required, two or more grooves may be necessary. In each instance, the utilization of a washer of the type herein described will result in sealing since this feature is inherent in this type of assembly wherein the washer itself is capable of deformation.

The principal object of this invention is to provide a self-locking, self-sealing combination washer and nut assembly wherein the nut is specifically designed to facilitate material flow of the nylon washer material to engage the correspondingly threaded portions of the nut and associated member to insure locking engagement therebetween.

Another object of this invention is to provide a combination self-locking and sealing washer and nut assembly wherein the flow of the washer material into the threaded portion of the nut and the correspondingly threaded member to which the nut is secured constitutes a self-locking feature whereby the washer material is deformed substantially to the configuration of the correspondingly threaded member thus providing a seal therebetween.

It is still another object of this invention to provide a nut and washer assembly wherein degrees of locking and sealing can be obtained with the assembly by varying the groove number, location and design thereof in the nut body in accordance with the specific application intended.

A further object of this invention is to provide a combination self-locking and sealing nut and washer assembly wherein the characteristics of the washer material insure deformation thereof upon the application of the assembly to the correspondingly threaded member.

A still further object of this invention is to provide a combination self-locking and sealing nut and washer assembly capable in design of being highly resistant to loosening by vibration.

These and other objects of this invention will become readily apparent from the following description taken in connection with the accompanying drawing wherein:

FIGURE 1 is a cross-sectional view of the combination washer and nut assembly.

FIGURE 2 is a cross-sectional view of the nut prior to being threaded, illustrating the recessed portion into which the washer is placed and the corresponding grooves adaptable to receive the flow of washer material upon application of the assembly.

FIGURE 3 is a bottom view of the right hand threaded nut taken substantially in the direction of the arrows on line 3—3 of FIGURE 2 and illustrating the angular disposition of the side portions of the grooves with respect to a radius line lying in a plane passing through the axis of rotation of the nut and medially of the groove and showing the relationship of the grooves with the threaded portion of the nut.

FIGURE 4 is a sectional view of the nut taken substantially in the direction of the arrows on line 4—4 of FIGURE 3 and illustrating a groove and the angular relationship of the bottom of the groove with respect to a plane extending perpendicular to and passed through the axis of rotation of the nut.

FIGURE 5 is a cross-sectional view of the nut and washer unit assembled to a bolt extending through an opening formed in a work surface.

Referring directly to FIGURE 1 of the drawing, the nut and washer assembly 10 comprises a nut body 12. One end 14 of the nut body has a chamfered opening 16 formed therein which forms an axial extremity of a threaded passage 18 extending throughout the axial length of the nut. The outer periphery 20 of the nut adjacent the chamfered opening has an annular crown thereon which is provided to facilitate the formation of the nut structure and forms no part of the invention. The other end 22 of the nut remote from the chamfered opening has an annular recess 24 (FIGURE 2) therein communicable with the threaded passage 18 formed in the nut body 14 and has a diametral dimension substantially larger than the passage. Washer 26 made of a pliable resilient material is disposed into the recessed portion 24 of the nut wherein surface 28 on the washer angularly corresponds to a conical surface 30 formed in the recess 24 and adjacent the threaded passage. The washer is secured to the nut body by a press fit but staking or other suitable means may be employed. In obtaining the proper material for utilizing the inventive concept, certain characteristics of different materials were observed. For the particular application herein disclosed, emphasis on flowability vs. pressure, elasticity, cold and heat resistance and strength characteristics are important. Nylon proved to be acceptable and accordingly, has been used. However, it is important to note that the specific material for the washer does not form a part of the invention presented herein.

A series of three circumferentially spaced grooves 32 are formed in surface 30 and extend from an annular wall 34 defining the diametral extremities of the recess 24 radially inwardly to the passage 18 formed in the nut body to intersect the threads therein. Although three grooves are discussed and shown on the drawing as the preferred embodiment of the invention, as hereinbefore mentioned, one, two or more grooves may be utilized depending upon the nature of the application of the fastener and still not depart from the scope of the invention.

To obtain the optimum results in applying the concept, the angular positioning of the side portions of the grooves with respect to a radius line lying in a plane passing through the axis of the nut and medially of the groove should not impede material flow. Effective operation has been obtained with the angle of the groove falling in a range up to and including approximately 30° with respect to the radius line of FIGURE 3. However, a 15° angle of the groove has proved entirely satisfactory using nylon as the washer material. The specific reasons for the angular disposition of the grooves pertain to the enhanced locking feature of the assembly and will hereinafter be described in connection with the removal thereof from a correspondingly threaded member. Each of the radially extending grooves are equally spaced from one another at an angular disposition of approximately 120°. This equally spaced positioning of the grooves is merely exemplary of the possible arcuate spacing of the grooves with respect to one another and other spacing as well as an increase of number of grooves may be desirable to obtain a more suitable material flow pattern. However, for purposes of simplicity, the 120° spacing relationship between the three grooves will be referred to hereinafter.

The preferred embodiment of this invention relating to a particular groove formation will be herein discussed wherein the concept has been applied to a nylon washer and nut assembly. Referring to FIGURE 4 of the drawing, the surface 30 extends radially inwardly from the annular wall 34 at an optimum angle of approximately 30° with respect to a plane passed perpendicularly through the axis of rotation of the nut. However, effective operation of the unit has been obtained wherein the angle of the work surface has been at a minimum of approximately 20° with respect to the reference plane. At this minimum disposition of the work surface, an effective material flow pattern can be established to permit the washer material to enter the grooves and engage the cooperably threaded members. The bottoms 36 of the grooves similarly extend radially inwardly having an axial depth forming an angle of approximately 35° with respect to the plane passed perpendicularly through the axis of the rotation of the nut. The particular angle of the groove bottom is based upon several factors; one being the optimum axial depth of the groove with respect to the angle of the annular working surface for material flow purposes, while another factor is the determination of the corresponding angle of the washer face based upon the predetermined torque requirement necessary for applying the assembly. The angle at which the bottom of the groove is formed extends over a range which includes a minimum angle of approximately 20° with respect to the reference plane. At this angle, a parallel relationship with the work surface 30 is established which enables the groove to substantially perform its intended function; but for optimum results, using nylon as the washer material, an angle of approximately 35° has been determined. In arriving at the angle of the bottoms of the grooves, the amount of force necessary to apply the nut and washer assembly to a working surface must be calculated. This force requirement calculation includes consideration of the deformation characteristics necessary to provide displacement of the washer material into the threaded portion of the nut and the correspondingly threaded member. By increasing the grooves bottom angle, outside the suggested range, less force is necessary to displace a corresponding amount of washer material into the enlarged grooves, but more washer material is necessary. Thus at an increased bottom angle, the groove length is substantially increased, necessitating more material to fill the groove but advantageously, a greater axial length of the engaging threads is covered by the displacement of the washer material. Conversely, decreasing the grooves bottom angle increases the amount of force necessary to displace material but less washer material is required. Thus a similar amount of axial length of the engaging threads is filled by the washer but the overall axial length of the assembly is kept to a minimum. With these limiting factors under consideration, the optimum angle of 35° was obtained.

The concepts of providing the angular disposition of the side portions of the groove with respect to a radius line lying in a plane passing through the axis of the nut and medially of the groove and the angular disposition of the bottom of the groove with respect to a plane passed perpendicularly though the axis of rotation of the nut, cooperate effectively to enable the nut and washer assembly to accomplish the objects as set forth hereinbefore. For example, in the application of the nut and washer assembly to bolt 38 which has a correspondingly threaded stem 40 (FIGURE 5) the threading of the nut onto the stem can be readily accomplished by a hand operation. This is due to the inside diameter dimension of the washer in an uncompressed state, being greater than the diameter of the threaded end of the stem. Upon engaging the nut and washer assembly with a working surface 42 forming a part of a work piece 44, continued rotation of the nut causes the nut to move axially toward the work surface and thereby compress that portion of the washer extending axially outwardly from the recessed end portion of the nut. With continued rotation of the nut and continued axial movement thereof, deformation of the washer takes place wherein the material is directed into the grooves 32 and accordingly, from the grooves downwardly and radially inwardly into the threaded portion of the stem 38 as well as inwardly into the opening 46 formed in the work piece 44. One end of each groove is of an axial dimension substantially greater than the end portion of the groove adjacent the annular wall 34 due to the angular relationship of the groove bottom with respect to the work surface 30 thereby providing a funnel configuration allowing a greater amount of material to flow inwardly toward the stem and accordingly, cover a greater axial length as well as the circumferential surface area of the stem. Similarly, the direct abutment of one end of the grooves with the wall 34 restricts the direction of movement of the washer material whereby the displacement is substantially radially inwardly toward the engaging threads of the nut and bolt stem. Upon tightening the nut onto the bolt stem, the washer material is disposed within the recessed portion, the available area provided by the allowable tolerances between the threaded portion of the nut and bolt stem and axially intermediate the nut and the work surface. Washer material so displaced relative to the work surface not only provides a proper seal therebetween but prevents contact of the nut with the work surface tending to destroy or mar the finish thereof, thus providing uniquely satisfactory results for certain applications such as an assembly of enameled surfaced material.

Due to the displacement of the washer material upon application, it is necessary upon removal of the assembly to unscrew the washer from the bolt stem since threads are formed on the inside diametral surface of the washer by the displacement of the material into the threads of the bolt stem. Consequently, it becomes necessary to provide a means which will enable an operator to remove the nut and the washer simultaneously. The grooves 32, having substantially funneled a portion of the washer material into the engaging threads retain enough of the washer material therein to form projections on the washer surface wherein the projections have substantially the same configuration as the grooves. These projections transfer torque applied to the nut to the washer and accordingly, unthread the washer and nut simultaneously as an assembly.

The optimum angular groove disposition of 15° enables the application of the nut to be performed in a relatively smooth manner. As the nut is rotated (referring to FIGURE 3 wherein a right-hand threaded nut is shown) in a counterclockwise direction, the grooves allow the washer material to be displaced in a trailing motion with respect to the direction of rotation of the nut; that is, as the nut is rotated, the material is disposed into the engaging thread by the trailing edge 48 of the grooves. However, upon removal of the assembly, the force required to release the nut and washer assembly must be substantially great enough to overcome the resistance provided by the "jamming" action or material buildup occurring at the threads by clockwise rotation of the nut. The angular disposition of the grooves works not only as a means to readily prevent removal of the nut but the nature of the function of the combination washer and nut assembly, that being its self-locking capabilities, is enhanced by the additional reaction of the washer material produced by the angle of the grooves with respect to the aforementioned radius line in resisting any form of motion tending to remove the assembly from engagement with the work piece surface.

In applications where vibrational forces are prevalent in great magnitude, the angle of the grooves as shown in FIGURE 3 is more effective where the "jamming" action occurs upon the application of reverse torque. In other fastener applications when vibrational forces are not a factor, straight grooves (not shown) as mentioned above, would extend radially inwardly in a direction parallel to a radius line extending from the axis of rotation of the nut. In like manner, for other applications, the grooves could be directed up to and including a 30° angle to the right of the radius line shown in FIGURE 3 for a right-hand threaded nut thereby increasing the "jamming" action of the material upon initial application of the nut, however, substantially decreasing the tendency of the nut to resist forces tending to remove or loosen the assembly from the bolt stem and engaging work surface.

At such time when the assembly is removed from the bolt stem, the washer, due to the resilient nature of the material, tends to expand and return to its original configuration. Once the threads are formed by the application of the fastener and the corresponding expansion of the material occurs after removal, an increase of the pitch of the threads takes place. Upon replacing the nut onto the bolt stem due to the non-cooperating thread pitches, reapplication of the nut is difficult requiring the formation of an entirely new threaded surface on the washer. The formation of the new thread causes additional displacement of the washer material and the self-locking and sealing functions of the assembly are thereby retained.

It is to be understood that the self-sealing function is readily obtainable in the application of this design fastener in that all available tolerances provided for the manufacture of correspondingly engaging threads is occupied by the washer material. Any slack in the threaded elements will be compensated for by the deformation of the washer material and accordingly, this deformation substantially seals the assembly with the bolt stem and the opening into which the bolt stem is inserted by the engagement of the fastener with the work surface. However, the concept of the locking feature is not insured for many applications in an assembly wherein a deformable washer and nut are utilized as a unit. The provision of a groove or grooves and their respective location in a combination nut and washer assembly as hereinbefore set forth establishes a unique locking feature heretofore not available.

FIGURE 5 best illustrates the relationship of the nylon as it is disposed into the threaded surfaces of the nut and bolt stem and the relationship of the material with respect to the recessed portion of the nut and the working surface and the opening formed in the work piece. It is important to note that the angular relationships between the work surface 42 and the bottom 36 of the grooves 32 and the grooves themselves are dependent upon specific applications of the fastener and can be readily adjusted for individual requirements of the lock and seal type of application to which the assembly is best suited.

While the present invention has been described in connection with certain specific embodiments, it is to be understood that the foregoing description is merely exemplary and that the concept of this invention is susceptible of numerous other modifications, variations and applications which will be apparent to persons skilled in the art. The invention is to be limited therefore only by the broad scope of the appended claims.

I claim:
1. A fastener device comprising, in combination
    an elongate body member having a bore extending generally longitudinally therethrough with one end portion of the bore having a smaller cross-sectional area than the other end portion thereof and an annular surface disposed intermediate the differential cross-sectional area portions of the body member,
    said one end portion of the bore being internally threaded,
    said surface of the body member being tapered and disposed at an angle of approximately between 20°–30° relative to a lateral plane passing normal to the longitudinal axis of the body member,
    said surface further having groove means defined by circumferentially spaced apart side portions and a bottom portion connecting adjacent ones of the side portions together with the groove means extending generally radially through the full longitudinal extent of said surface from the internal threaded end portion of the bore to the larger cross-sectional area of the other end portion of the body member,
    the bottom portion of the groove means being disposed at an angle of approximately between 25°–35° relative to the lateral plane which passes normal to the longitudinal axis of the body member with the inclination of the bottom portion of the groove means relative to the longitudinal axis of the body member being approximately 5° greater than the inclination of said tapered surface thereto,
    a deformable washer disposed in the larger cross-sectional area of the other end portion of the bore in the body member in engagement with the annular surface, whereby
    a portion of said washer will be deformed on threading engagement of the internally threaded end portion of the body member to cooperating threads of an externally threaded element and be urged between the threads to effectively lock the fastener device between the fastener device and such element and further to effectively create a seal between the cooperating threads.

2. A fastener device comprising, in combination
    an elongate body member having a bore extending generally longitudinally therethrough with one end portion of the bore having a smaller cross-sectional area than the other end portion thereof and an annular surface disposed intermediate the differential cross-sectional area portions of the body member,
    said one end portion of the bore being internally threaded,
    said annular surface of the body member being tapered and disposed at an angle of approximately between 20°–30° relative to a lateral plane passing normal to the longitudinal axis of the body member,
    said annular surface further having groove means defined by circumferentially spaced apart side portions and a bottom portion connecting adjacent ones of the side portions together with the groove means extending generally radially through the full longitudinal extent of the annular surface from the internally threaded end portion of the bore to the larger cross-sectional area of the other end portion of the body member,
    the bottom portion of the groove means being disposed at an angle greater than 20° but less than 35° relative to the lateral plane which passes normal to the longitudinal axis of the body member with the inclination of the bottom portion of the groove means relative to the longitudinal axis of the body member being greater than the inclination of the annular tapered surface thereto, said side portions of the groove means being angularly disposed relative to a radial plane passing through the longitudinal axis of the body member with such radial plane being medially disposed relative to the adjacent ones of the side portions of the groove means with the angular disposition of the side portions of the groove means relative to the radial plane being in the range up to and including approximately 30°, and a deformable washer disposed in the larger cross-sectional area of the other end portion of the bore in the body member in engagement with the annular surface, whereby a portion of said washer will be deformed on threading engagement of the internally threaded end portion of the body member to cooperating threads of an externally threaded element and be urged between the threads to effectively lock the fastener device between the fastener device and such element and further to effectively create a seal between the cooperating threads.

3. A fastener device comprising, in combination an elongate body member having a bore extending generally longitudinally therethrough with one end portion of the bore having a smaller cross-sectional area than the other end portion thereof and an annular surface disposed intermediate the differential cross-sectional area portions of the body member, said one end portion of the bore being internally threaded, said annular surface of the body member being tapered and disposed at an angle of approximately between 20°–30° relative to a lateral plane passing normal to the longitudinal axis of the body member, said annular surface further having groove means defined by circumferentially spaced apart side portions and a bottom portion connecting adjacent ones of the side portions together with the groove means extending generally radially through the full longitudinal extent of the annular surface from the internally threaded end portion of the bore to the larger cross-sectional area of the other end portion of the body member, the bottom portion of the groove means being disposed at an angle of approximately between 25°–35° relative to the lateral plane which passes normal to the longitudinal axis of the body member with the inclination of the bottom portion of the groove means relative to the longitudinal axis of the body member being appoximately 5° greater than the inclination of the annular tapered surface thereto, said side portions of the groove means being angularly disposed relative to a radial plane passing through the longitudinal axis of the body member with such radial plane being medially disposed relative to the adjacent ones of the side portions of the groove means with the angular disposition of the side portions of the groove means relative to the radial plane being in the range up to and including approximately 30°, and a deformable washer disposed in the larger cross-sectional area of the other end portion of the bore in the body member in engagement with the annular surface, whereby a portion of said washer will be deformed on threading engagement of the internally threaded end portion of the body member to cooperating threads of an externally threaded element and be urged between the threads to effectively lock the fastener device between the fastener device and such element and further to effectively create a seal between the cooperating threads.

4. A fastener device comprising, in combination an elongate body member having a bore extending generally longitudinally therethrough with one end portion of the bore having a smaller cross-sectional area than the other end portion thereof and an annular surface disposed intermediate the differential cross-sectional area portions of the body member, said one end portion of the bore being internally threaded, said annular surface of the body member being tapered and disposed at an angle of approximately between 20°–30° relative to a lateral plane passing normal to the longitudinal axis of the body member, said annular surface further having groove means defined by circumferentially spaced apart side portions and a bottom portion connecting adjacent ones of the side portions together with the groove means extending generally radially through the full longitudinal extent of the annular surface from the internally threaded end portion of the bore to the larger cross-sectional area of the other end portion of the body member, the bottom portion of the groove means being disposed at an angle of approximately between 25°–35° relative to the lateral plane which passes normal to the longitudinal axis of the body member with the inclination of the bottom portion of the groove means relative to the longitudinal axis of the body member being approximately 5° greater than the inclination of the annular tapered surface thereto, said side portions of the groove means being angularly disposed relative to a radial plane passing thorugh the longitudinal axis of the body member with such radial plane being medially disposed relative to the adjacent ones of the side portions of the groove means with the angular disposition of the side portions of the groove means relative to the radial plane being approximately 15°, and a deformable washer disposed in the larger cross-sectional area of the other end portion of the bore in the body member in engagement with the annular surface, whereby a portion of said washer will be deformed on threading engagement of the internally threaded end portion of the body member to cooperating threads of an externally threaded element and be urged between the treads to effectively lock the fastener device between the fastener device and such element and further to effectively create a seal between the cooperating threads.

References Cited by the Examiner

UNITED STATES PATENTS

| 952,507 | 3/10 | Burns | 151—7 |
|---|---|---|---|
| 1,015,059 | 1/12 | Morgan | 151—14.5 |
| 1,604,298 | 10/26 | Neitzel | 151—7 |
| 2,343,235 | 2/44 | Bashark. | |
| 3,040,796 | 6/62 | Gouverneur | 151—7 |

FOREIGN PATENTS 440,906   5/12   France.

EDWARD C. ALLEN, *Primary Examiner.*